Nov. 21, 1933.　　　　F. DITCHFIELD　　　　1,935,768
HOUSE CAR DOOR CONSTRUCTION
Filed May 5, 1930　　　3 Sheets-Sheet 3
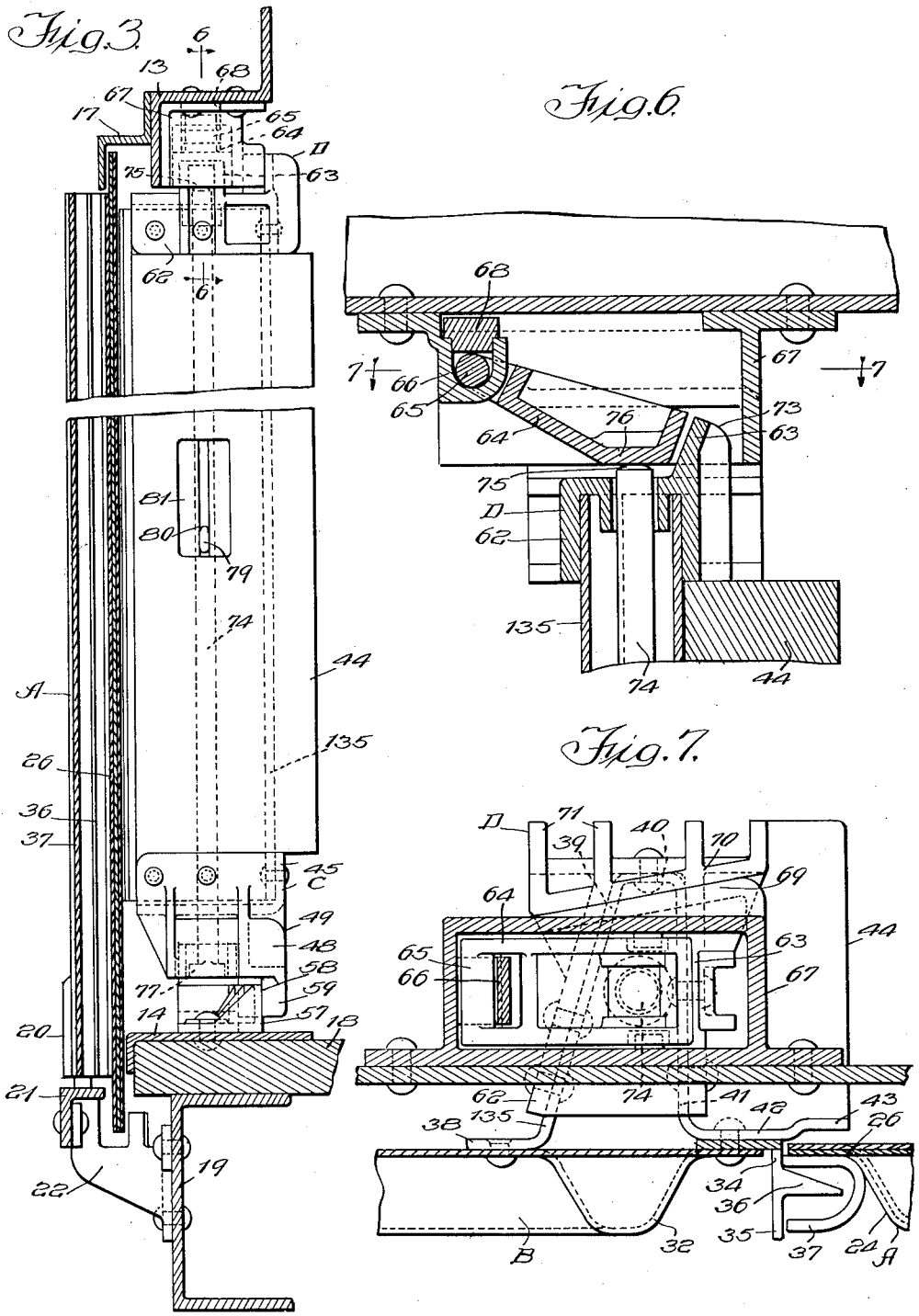
Witness:
William P. Kilroy
Inventor:
Frank Ditchfield
By Joseph Harris
His Atty.

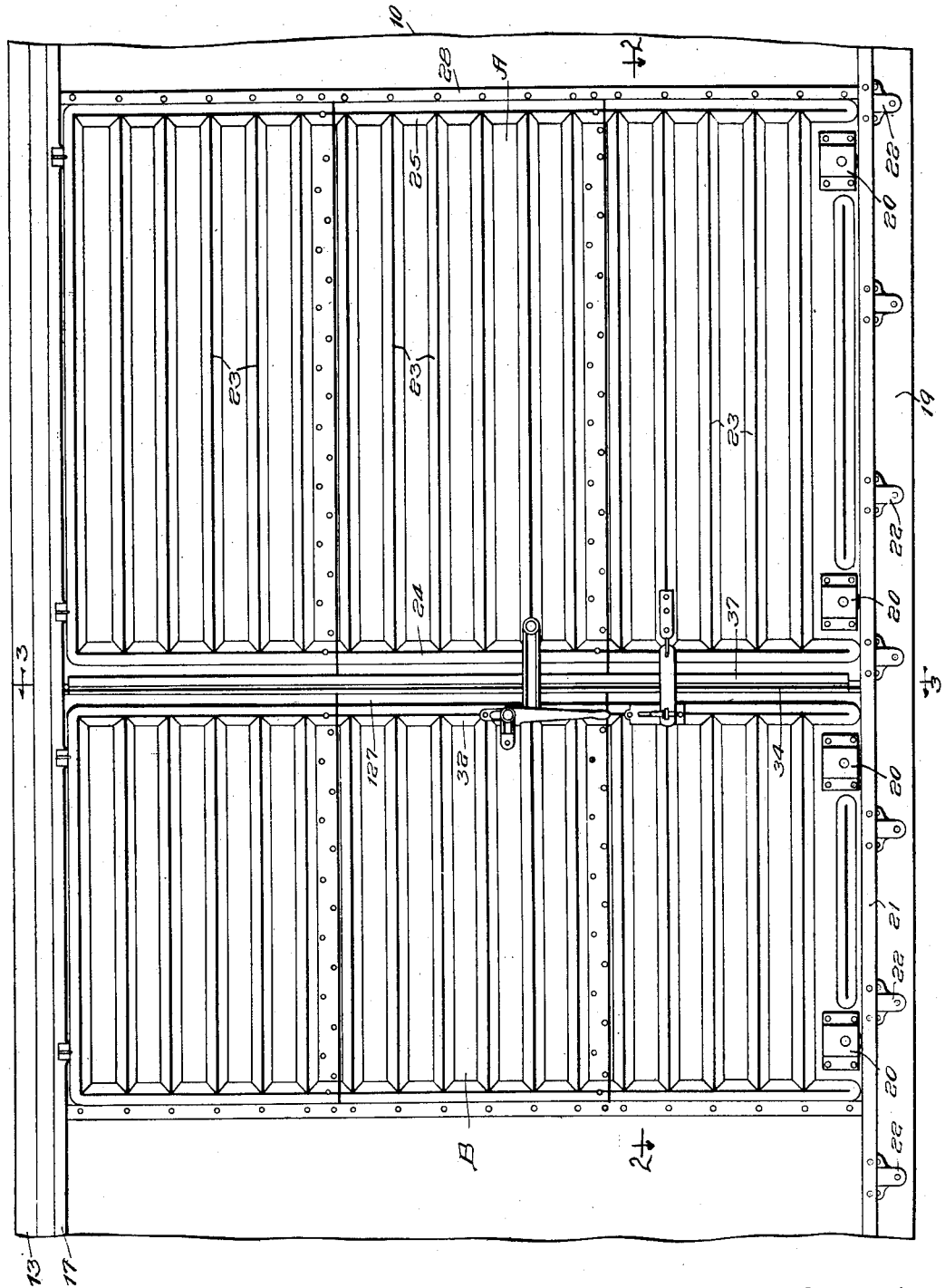

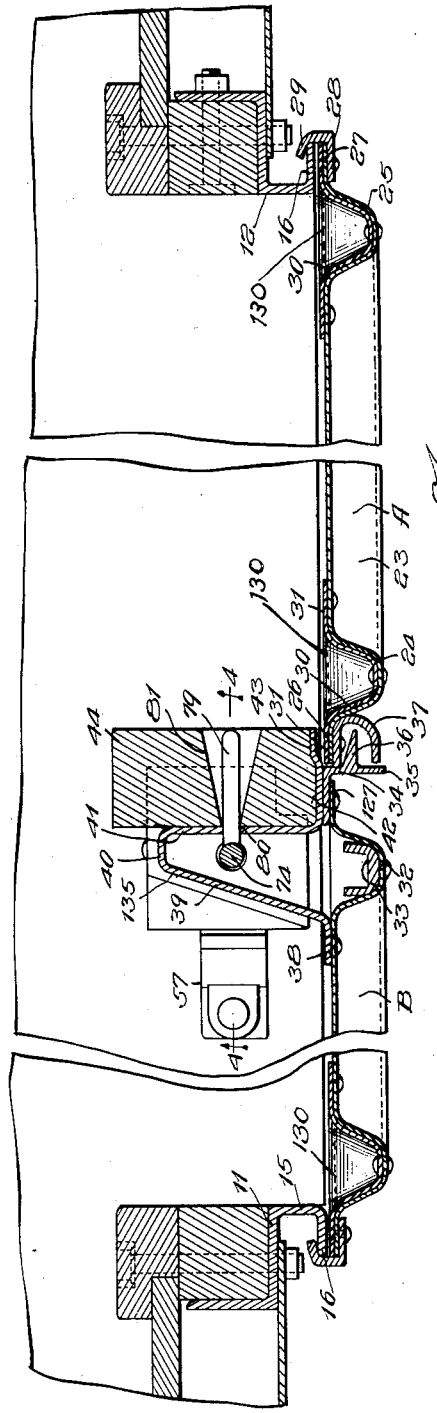

UNITED STATES PATENT OFFICE 1,935,768

HOUSE CAR DOOR CONSTRUCTION

Frank Ditchfield, Cleveland, Ohio, assignor to The Youngstown Steel Door Company, Cleveland, Ohio, a corporation of Ohio Application May 5, 1930. Serial No. 449,721

17 Claims. (Cl. 189—46)

This invention relates to improvements in house car door construction.

One object of my invention is to provide a double door construction particularly adapted for house cars such as automobile cars and box cars, wherein great strength is obtained in the door arrangement to effectively resist lateral pressure or blows from the load while the car is in transit.

Another object of my invention is to provide a double door construction wherein the auxiliary door is provided along the forward edge thereof with a combined post, brace and weather sealing arrangement of efficient and rugged construction especially designed to prevent lateral deflection or distortion of the auxiliary door.

A further object of my invention is to provide a novel arrangement for the forward edge of a car door to form an efficient weather seal such that, regardless of the direction of movement of the car, rain, snow or other foreign matter will be trapped and knocked down as it is driven into an air chamber of the sealing arrangement and thereafter discharged at the bottom.

Another object of my invention is to provide a main and auxiliary door arrangement wherein the auxiliary door is provided with a post of light but rugged construction and so attached to the door proper as to effectively resist forces tending to twist the post.

A still further object of the invention is to provide, for an auxiliary door having a post along the forward edge thereof, combined latching and restraining means to effectively prevent either longitudinal or lateral shift of the door when it is in closed position.

Other objects of the invention will more clearly appear from the description and claims hereinafter following.

In the drawings, forming a part of this specification, Figure 1 is a side broken elevational view of a portion of a house car showing my improvements in connection therewith. Figure 2 is a broken, horizontal, sectional view, upon an enlarged scale, corresponding to the section line 2—2 of Figure 1. Figure 3 is a broken, vertical, sectional view upon an enlarged scale corresponding to the line 3—3 of Figure 1. Figure 4 is a vertical, detailed sectional view corresponding to the section line 4—4 of Figure 2. Figure 5 is a horizontal, sectional view, corresponding to the section line 5—5 of Figure 4. Figure 6 is a vertical, sectional view corresponding to the line 6—6 of Figure 3. And Figure 7 is a horizontal, sectional view corresponding to the section line 7—7 of Figure 6.

In said drawings, 10 indicates a portion of the side wall of a house car such as an automobile car and within which wall is provided a double door opening defined by door posts 11 and 12, lintel 13 and threshold 14. Each of the door posts preferably comprises a Z element, the outwardly extended flange 15 of which has a portion thereof turned backwardly, as indicated at 16, to cooperate with the weather sealing element of the corresponding adjacent door, as hereinafter described. The lintel 13 is shown as formed by the usual Z side plate of the car and to the outer flange of which is secured a longitudinally extending Z guide plate 17 for the upper edges of the doors hereinafter described. The threshold 14 proper is in the form of a flange plate mounted on the flooring 18, the latter in turn being supported by the underframing, including the channel side sill 19, shown in Figure 3. In carrying out my invention, I employ a main door, designated generally by the reference character A, and an auxiliary door designated generally by the reference character B, said doors being horizontally slidable and of the bottom hung type, each door having for this purpose secured thereto roller supports 20—20 which ride upon a horizontal angular track 21, supported by brackets 22—22 applied to the channel side sill of the car at suitable intervals, as shown in Figures 1 and 3. Outward movement of the door is prevented by reason of the upper and lower edges of the door riding behind the guide plate 17 and track 21, respectively, as shown in Figure 3.

The main door A is composed mainly of sheet metal in the form of three panels arranged one above the other, said panels having outwardly disposed horizontally extending strengthening corrugations 23—23 which merge at their ends, with outwardly extended front and rear vertical corrugations 24 and 25, the latter being somewhat spaced from the front and rear edges proper of the door to thereby leave flat marginal portions 26 and 27, respectively. To the rear vertical edge of the door A is secured an angular member 28, having one of its flanges extended inwardly and then bent forwardly, as indicated at 29, so as to provide a weather seal in conjunction with the door post section 16 heretofore referred to. As best shown in Figure 2, each of the vertical corrugations 24 and 25 is reinforced and braced by a formed plate 30 of special construction. Each said plate 30, which extends from top to bottom of the door, has the intermediate portion thereof which spans the middle panel and the lap joints of the panels, formed as shown in section in Figure 2, to fit the corrugation. Above and below said formed intermediate portion, each plate 30 is left flat, as indicated at 130 in Figure 2 so as to bridge the upper and lower portions of the corrugation and act as a strut. In the case of the rear corrugation 25, these strut-like portions near the top and bottom of the door are particularly valuable inasmuch as they effectively resist the blows delivered to the door when the latter is moved against the back stops (not shown) on the car side. Said plate has flanges 31—31 for its full length, which are riveted to the marginal portions of the door proper outwardly of the corrugation and to the main portion of the sheet metal inwardly of the corrugation. The intermediate formed portion of the plate will also be riveted to the top of the corrugation, as shown in Figure 2.

Insofar as the door A has been described, the auxiliary door B is substantially the same except that, within the forward vertically extending corrugation 32 of the auxiliary door B, a U-section bracing element 33 is employed, riveted at intervals to the corrugation 32. The rear vertical corrugation of the door B is braced in the same manner as the two vertical corrugations of the door A.

The auxiliary door B is provided at its front edge with a combined post and bracing construction and a weather sealing arrangement cooperable with a weather sealing element on the door A. This construction includes an angular element 34 and a metal post 135 of approximately deep V or trough-like cross section. The angular member 34 is secured to the inner face of the front flat marginal portion 127 of the door B and has an outwardly extended flange 35 extending normally to the main planes of the doors A and B, said flange 35 having a forwardly projecting tapered flange 36 located approximately at the middle of the flange 35. As will be understood, the sealing element 34 extends substantially the full height of the door B. Said tapered flange 36 is arranged to enter a U-section or open mouth cooperable sealing element 37 secured to the outer face of the flat marginal portion 26 of the door A, the depth of the sealing element 37 being approximately equal to the depth of the vertical corrugations of the door A. When the two doors are in closed position, as best shown in Figure 2, it will be observed that the flange 35 of the auxiliary door sealing element will completely overlie the mouth of the sealing element 37 and in fact projects outwardly therebeyond a short distance. Further, it will be observed that the inner section of the sealing element 37 is adapted to abut the flange 35 of the sealing element 34 so that the latter serves as a stop for the door A, this stop being approximately in the same plane as the main plane of the door B. With this construction, a very effective weather seal is provided inasmuch as, when the car is moving toward the left as viewed in Figure 2, the flange 35 will act as a deflector for the rain, snow and the like with very little possibility of any of the rain or snow being driven into the joint. Similarly, when the car is moving in the opposite direction, the vertical front edge corrugation of the door A serves as a deflector for the greater part of the rain, snow and the like. Such snow or rain or other foreign matter as may enter the slight opening between the outer section of the sealing element 37 and the flange 35 will enter the vertical pocket formed between said outer section and the tapered flange 36 and will be knocked down, that is, its momentum will be destroyed within the air chamber and the same will empty out through the bottom of the weather sealing arrangement. Should the driving force of the foreign matter be sufficient to force any of it around the free edge of the flange 36, it will be caught within the second chamber formed between the flange 36 and the inner section of the sealing element 37, and thus trapped and permitted to discharge from the bottom of the doors. Further, a sealed joint is formed between the abutting portions of the elements 37 and 34 so that it is practically an impossibility for any foreign matter to pass the joint and enter the car, regardless of the direction of movement of the car.

The bracing post 135 is of special formation, preferably made from heavy gauge sheet metal and has a flange 38 riveted to the main sheet metal portion of the door B, an inwardly and forwardly inclined relatively deep section 39, a relatively narrow section 40 extending parallel to the plane of the door B, an outwardly extended relatively deep section 41 arranged normally to the plane of the door B, and a forwardly extended flange 42 riveted to the marginal portion 127 and sealing element 34. Said flange 42 is preferably slightly inwardly offset at its forward edge as indicated at 43 to thereby provide a better guiding mouth for the forward edge of the door A when the latter is moved to closed position. With this construction, it will be observed that the forward edge portion of the door B is securely braced and particularly against twisting about a vertical axis, the post 135 having the integral, strut-like bracing section 39 which effectively accomplishes this result, and in this connection it will be observed that the flanges of the post 135 are secured to the door B at opposite sides of the front vertical corrugation. It will further be observed that the rivets for attaching the post 135 may be readily applied since they are easily accessible from both sides of the door. 44 indicates a wood nailing strip secured to the post 135 in the angle formed by the sections 41 and 42.

For latching and restraining the door B when in closed or operative position, the following arrangement is employed. Secured to the bottom of the post 135, as best shown in Figures 3, 4 and 5, is a cap casting C and at the top of the post a corresponding cap casting D. The casting C has an upstanding flange 45 conforming to the contour of the post and riveted thereto, as shown in Figure 4. From the horizontal web section 46 of said casting depends a hood or skirt having an outer section 47 parallel with the door, a transversely extending section 48 and an inner section 49 parallel to the section 47, both of said sections 47 and 49 being braced by suitable ribs 50—50. The section 48 is of generally arcuate form, as shown in Figure 4, with an inner curved edge 51 by which is provided a bearing 52 for the journal section 53 of a gravity latch 54. The latter is of such width as to be guided between the sections 47, 48 and 49 of the cap casting C, as apparent from Figure 5. The latch 54 is formed at its outer free end with a bearing shoulder 55 adapted to cooperate with a sloping shoulder 56 formed on an anchor casting 57 riveted to the threshold of the car.

Said anchor casting 57 is further provided with an inclined wedge or camming flange or shoulder 58 extending forwardly and inwardly with respect to the door B and with which is adapted to engage and cooperate a corresponding flange 59 formed on a depending portion of the cap casting C, as shown in Figures 3, 4 and 5. Preferably, the cap casting C has opposed guide lugs 60—60 near the open mouth thereof, as shown in Figure 5, which work within grooves 61—61 formed on the sides of the latch 54 so as to retain the latter in place and prevent its dragging on the floor when the door B is being opened or closed.

The upper cap casting D is flanged, as indicated at 62, to fit the top of the post 135 and to which it is riveted, said cap casting having an upwardly sloping stop shoulder 63 with which is adapted to cooperate a gravity latch 64 having a journal section 65 mounted in a bearing 66 formed integral with another anchor casting 67 riveted to the lintel of the door opening. Said latch 64 is retained in place by a filler block 68 applied in place when the anchor casting 67 is attached to the lintel. The anchor casting 67 has a forwardly and inwardly directed camming or wedge flange 69 with which cooperates a correspondingly inclined flange 70 formed integral with the cap casting D, as best shown in Figure 7, said flange 70 of the cap casting being braced by ribs 71—71.

When the door B is moved to closed or operative position, it will be evident that the lower latch 54 will ride up over the inclined face 72 of the lower anchor casting and then drop behind the shoulder 56 to the position shown in Figure 4. Similarly, the upper cap casting D will ride under the latch 64 and the latter will be lifted by the rounded edge 73 of the cap casting until the door reaches its final position, whereupon the latch 64 drops into place behind the shoulder 63 in the position shown in Figure 6. In this manner, the post or door B is automatically latched when it reaches its fully closed position. Simultaneously with the door B reaching its fully closed position, the flanges 59 and 70 of the lower and upper cap castings will wedgingly engage the camming flanges 58 and 69 of the lower and upper anchor castings, respectively, so as to pull the door laterally inward and render the door tight so that it cannot vibrate laterally or permit outward springing of the auxiliary door.

To release the latches 54 and 64 when it is desired to move the auxiliary door to open position, the following arrangement is employed. Housed within the hollow post 135 and freely vertically slidable therein is a release rod 74 having a rounded upper end 75 adapted to engage a horizontal section 76 of the latch 64, as shown in Figure 6, whereby to lift the latch 64 from behind the shoulder 63. At its lower end, the rod 74 has a T-head 77, which is entered through an elongated slot 78 in the latch 54 and given a quarter turn to thereby form a loose bayonet joint connection. As will be evident, when the rod 74 is lifted, the latch 54 will also be lifted so as to disengage it from behind the shoulder 56 of the lower anchor block. In this manner both latches 54 and 64 are simultaneously released.

For actuating the rod 74, the latter is provided with a laterally extended handle 79, which is extended through a vertical slot 80 in the front section 41 of the post 135 and into a vertically elongated flared recess 81 cut in the nailing strip 44. As will be evident, the handle 79 is housed within the nailing strip although readily accessible, thus minimizing danger of breakage or injury from shifting loads. Further, it will be observed that the released handle 79 is accessible from the front of the auxiliary door B, that is, when the main door A is open, the operator may release the latches without the necessity of shifting any load that may be up against or around the nailing strip and post 35, an important consideration from a practical standpoint. Further, the release handle 79 may be utilized to limit the downward movement of the rod 74 by having the release handle 79 engage the bottom of the slot 80 in the post, as best indicated in Figure 3.

I have herein shown and described what I now consider the preferred manner of carrying out my invention, but the same is merely illustrative and I contemplate all changes and modifications that come within the scope of the claims appended hereto.

I claim:

1. In door construction, the combination with a slidable door and a member toward and from which said door is movable; and cooperable sealing devices on the forward edge of said door and member, said devices including vertically extending means of approximately horizontal U cross section and means having an approximately horizontal T section, the web of which is adapted to enter the U section when the door is closed.

2. In door construction, the combination with a slidable door and a member toward and from which said door is movable; and cooperable sealing devices on the forward edge of said door and member, said devices including a vertically extending element of approximately horizontal U cross section and an element having two flange sections substantially at right angles to each other, one flange section extending transversely to the general plane of the door to substantially close the opening of the U section and the other flange extending parallel to the general plane of the door and arranged to enter the U section when the door is closed.

3. In door construction, the combination with a slidable door and a member toward and from which said door is movable; and cooperable sealing devices on the forward edge of said door and member, said devices including vertically extending means of approximately horizontal U-cross section and means having an approximately horizontal T-section, the web of which is adapted to enter the U-section when the door is closed, said web being tapered to facilitate entry into the U-section.

4. In door construction, the combination with a slidable door and a member toward and from which said door is movable; and cooperable sealing devices on the forward edge of said door and member, said devices including a vertically extending element of U-cross section mounted on the forward edge of the door and a vertically extending element on said member having a horizontal T-section, the web of which enters the U-section when the door is closed.

5. In door construction, the combination with a slidable sheet metal door having a corrugation extending along the vertical forward edge thereof with a flat marginal portion outwardly of the corrugation, and a member toward and from which said door is movable; of a vertically extending U-section element secured to said flat marginal portion of the door with the opening of the U-section facing toward said member; and a vertically extending element secured to said member, said element having a flange extending transversely to the plane of the door and adapted to overlie the mouth of the U-section element when the door is closed, said second element having another flange extending from an intermediate point on said first named flange toward the door and adapted to enter the U-section element when the door is closed.

6. In a door construction, the combination with a door proper having the main portion thereof comprised of sheet metal and a hollow post attached to the forward edge of the door proper, said post comprising a vertically extending flange, a relatively deep section extending from said flange inwardly and forwardly, a longitudinally extending, relatively narrow section at the inner end of said first named section, an outwardly extending, relatively deep section from said longitudinal section and a forwardly extending integral flange, both of said flanges being secured in spaced relation to the main sheet metal portion of the door, said post being adapted to provide a relatively wide support for a nailing strip.

7. In door construction, a door proper having the main portion thereof comprised of sheet metal having a vertically extending, outwardly disposed corrugation along the forward edge thereof with a flat marginal portion beyond the corrugation, and a hollow post secured to the inner face of the door proper along its forward edge, said post comprising front and rear vertically extending flanges and an intermediate portion of relatively deep V-section, the flanges being secured to the marginal portion of the door and main portion thereof inwardly of the corrugation and the V-section being disposed opposite the corrugation.

8. In door construction, the combination with a door proper having a hollow post extending along the forward edge thereof; a nailing strip secured to the forward side of the post; means for latching the post when the door is in closed position; and devices for actuating the latching means including a member disposed within the hollow post and an element connected to said member extending forwardly through the nailing strip.

9. In a house car having a door opening, the combination with a door provided with a post extended along the front edge thereof; of cooperable means on the post and adjacent fixed part of the house car for latching and bracing the post against longitudinal and lateral movement when the door is in closed position, said means including two members secured to the post and said fixed car part respectively and provided with cooperable side wedging faces and a latch proper attached to one of said members and cooperable with a shoulder on the other, the latch retaining the wedging faces in engagement when the latch is operative.

10. In a house car having a door opening, the combination with a slidable door having a post extending vertically along the forward edge thereof; and cooperable means on the bottom of the post and threshold of the door opening for latching and bracing the post against longitudinal and lateral movement when the door is in closed position, said means including a member secured to the bottom of the post, a latch mounted on said member, and an anchor block secured to the threshold, said latch and block having cooperable shoulders and said block and member having cooperable engageable shoulders limiting lateral movement of the door when the latter is in closed position.

11. In a house car having a door opening, the combination with a door provided with a post extending vertically along the forward edge thereof; of cooperable means on the upper end of said post and lintel of the door opening for latching and bracing the post against longitudinal and lateral movement when the door is in closed position, said means including a member secured to the top of the post, a member secured to the lintel, a latch attached to the lintel member, said latch and first named member having cooperable shoulders and said members having cooperable, laterally engaging faces to limit lateral movement of the door when the latter is in closed position.

12. In a house car having a door opening, the combination with a main door; of an auxiliary door, said auxiliary door having a vertically extending metal post along the forward edge thereof; cap castings secured to the top and bottom ends of said post; anchor blocks secured to the threshold and lintel respectively of the car; cooperable latching means on each set of cap castings and anchor blocks operative, when the auxiliary door is in closed position, to prevent opening movement thereof; and cooperable laterally wedging shoulders on each set of cap castings and anchor blocks cooperative to prevent lateral movement of the auxiliary door when and as latched.

13. In a house car having a door opening, the combination with a main door; of an auxiliary door having a post along the forward edge thereof; a cap casting secured to one end of said post; a latch detachably pivotally mounted within said cap casting; and an anchor block secured to the car opposite said cap casting, said anchor block having a shoulder cooperable with the latch, said anchor block and cap casting having engageable wedge faces for camming the door laterally inward when the latter is moved to closed position, the latch and anchor block when cooperatively engaged, retaining the wedge faces engaged.

14. In a house car having a door opening, the combination with a main door; of an auxiliary door having a post extending vertically along the forward edge thereof; a cap casting secured to one end of said post; an anchor block fixedly secured to the car; a latch pivotally mounted in said block, said latch and cap casting having cooperable shoulders and the block and cap casting having cooperable wedge faces for camming the door laterally when and as it is moved to closed position.

15. In door construction, the combination with a door proper comprised of sheet metal having a vertically extending corrugation formed therein, said corrugation being located adjacent a vertical edge of the door; of a combined, single piece reinforcement and strut for said edge of the door comprising a formed member having the top and bottom portions thereof flat and overlying and bridging the mouth of the corrugation and the intermediate portion thereof corrugated to fit within the corrugation of the door proper.

16. In a house car having a door opening and main and auxiliary sheet metal doors for closing said opening, the combination with a hollow metallic post secured to the vertical forward edge of the auxiliary door; of a nailing strip secured to the forward face of the post; cooperable latching means on the car body and post for retaining the auxiliary door in closed position; and means for releasing said latching means, the releasing means including a member housed within the post and an operating element extending from said member through the nailing strip and accessible for manipulation on the forward side of said nailing strip.

17. In a house car having a door opening, the combination with a door; of cooperable means carried by the lintel of the door opening and the forward upper corner of the door for latching and bracing the door against longitudinal and lateral movement when in its closed position, said means including: a shouldered member secured to the door; a member secured to the lintel having a gravity actuated latch cooperable with said first named member, and cooperable, laterally inclined faces on said members engageable when and as the latch and said member cooperatively engage to thereby maintain the inclined faces engaged.

FRANK DITCHFIELD.